United States Patent [19]

Tanaka et al.

[11] Patent Number: 4,864,427

[45] Date of Patent: Sep. 5, 1989

[54] DISK REPRODUCING METHOD AND APPARATUS FOR DISKS WITH DIFFERENT VIDEO BANDWIDTHS

[75] Inventors: Hozumi Tanaka; Hitoshi Kanamaru, both of Saitama, Japan

[73] Assignee: Pioneer Electronic Corporation, Tokyo, Japan

[21] Appl. No.: 136,670

[22] Filed: Dec. 22, 1987

[30] Foreign Application Priority Data

Dec. 22, 1986 [JP] Japan ................................ 61-305782
Mar. 13, 1987 [JP] Japan ................................ 62-59742
Mar. 13, 1987 [JP] Japan ................................ 62-59743

[51] Int. Cl.⁴ ............................................. H04N 5/76
[52] U.S. Cl. ................................................ 358/342
[58] Field of Search ....................... 358/335, 342, 343; 360/19.1, 33.1, 20; 369/50

[56] References Cited

U.S. PATENT DOCUMENTS

| | | | |
|---|---|---|---|
| 4,630,134 | 12/1986 | Kanamaru | 360/19.1 |
| 4,651,230 | 3/1987 | Hagita et al. | 358/343 |
| 4,683,502 | 7/1987 | Higashi et al. | 358/343 |
| 4,698,695 | 10/1987 | Kosaka et al. | 358/343 |
| 4,723,295 | 2/1988 | Kosaka et al. | 358/343 |
| 4,729,042 | 3/1988 | Ishii | 358/343 |
| 4,743,980 | 5/1988 | Dakin | 358/342 |
| 4,768,104 | 8/1988 | Kanamaru | 358/343 |

*Primary Examiner*—Donald McElheny, Jr.
*Attorney, Agent, or Firm*—Sughrue, Mion, Zinn, Macpeak & Seas

[57] ABSTRACT

A video disk player which can read two types of video disk. In the conventional video disk, analog audio channels are recorded in a frequency band between a digital audio channel and a video channel of a narrower bandwidth. In an advanced video disk, there is a digital audio channel and the video channel is extended downward to become adjacent to the digital audio channel. The disk player adjusts the lower frequency cut-off of a video band-pass filter in accordance with a detection of the type of disk, possibly by a special recorded code or by the detection of the analog audio carriers. Preferably, the video band-pass filter comprises a high-pass filter with an adjustable cut-off and a low-pass filter and the frequency-demodulator is positioned between these two filters.

12 Claims, 5 Drawing Sheets

DISK REPRODUCING METHOD AND APPARATUS FOR DISKS WITH DIFFERENT VIDEO BANDWIDTHS

BACKGROUND OF THE INVENTION

1. Field Of The Invention

The present invention relates to a record reproducing method for a recording medium and a reproduction apparatus thereof.

More particularly, the invention relates to a record reproducing method and a reproduction apparatus thereof for recording a video signal and a digital audio signal superposed on a recording medium and reproducing them.

The present invention also relates to a video disk record reproduction system which is optimized to be applied to an optical video disk.

2. Background Art

Figure 1:
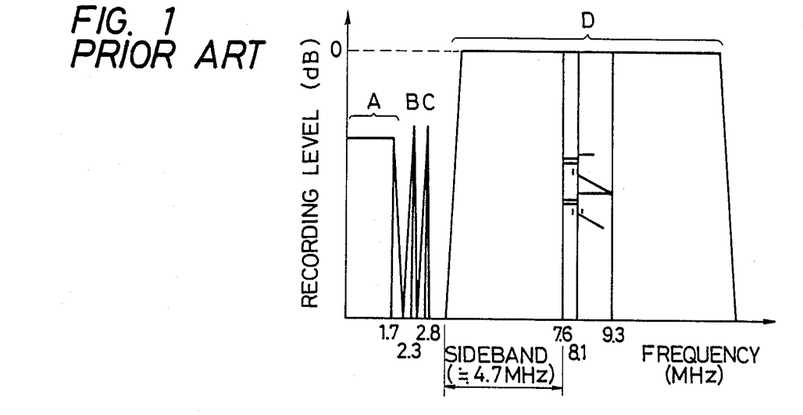
FIG. 1 shows a recording spectrum of a recording medium recorded by a conventional system.

A hi-fi video disk on which a digital audio signal with a compact disk (CD) format is recorded by superposition on a video disk is well-known as a recording medium on which a video signal and a digital audio signal are recorded as superposed signals. A record spectrum of this hi-fi video disk is shown in FIG. 1. In the figure, the portion marked A denotes an EFM (eight-to-fourteen modulation) signal component for digital audio, the portion marked B denotes a left channel FM signal component for analog audio, the portion marked C denotes a right channel FM signal component for analog audio, and the portion marked D denotes an FM signal component for a video signal.

In such a hi-fi video disk, the audio quality may be remarkably improved compared to the record reproduction of a audio signal by means of the FM modulation system since the dynamic range of a digital audio signal may be set at approximately 90 dB or more. On the contrary, however, the video band is determined by the width of the sideband area of the video FM signal. When the video band is made too wide, a bad influence is exerted on the reproduced video signal and the reproduced analog signal by the interference with the analog audio carrier. Therefore, it is difficult to set the band of the video signal at more than 4.5 MHz. Thus, the resolution is limited. Moreover, by the deviation of the duty ratio of a bit recorded on the disk, the audio FM carrier causes cross modulation with the video FM carrier and sometimes generates a beat in the reproduced signal.

Figure 2:
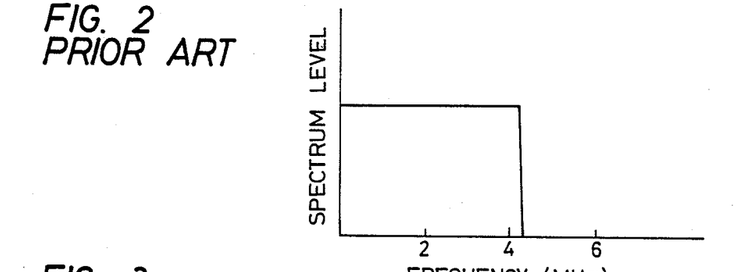
FIG. 2 is a spectrum of a video signal in the baseband thereof.
Figure 3:
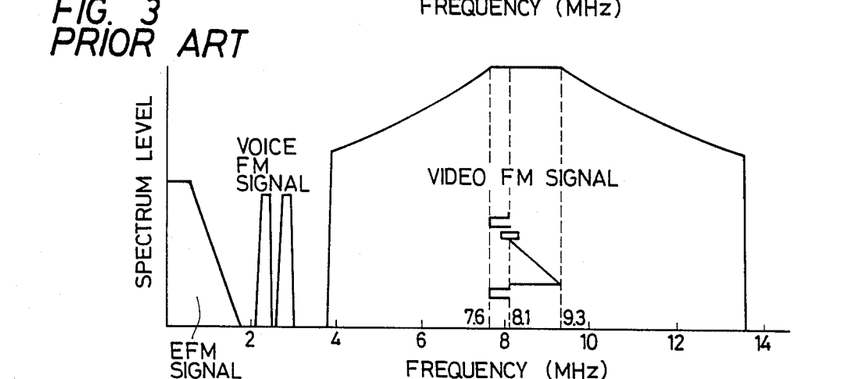
FIG. 3 is a spectrum of a recording signal thereof.

The above explanation is expanded in the following paragraphs. Hitherto, the frequency bandwidth of a video signal (a luminance signal) in the baseband has been set at 4.2 MHz in the case of the NTSC system. Therefore, its spectrum is as shown in FIG. 2. Since such a video signal is frequency modulated and recorded within the range of 8.1 MHz to 9.3 MHz (7.6 MHz to 8.1 MHz for the synchronous signal), the lower limit frequency of a first sideband on the lower side of the video FM signal will be at approximately 3.9 MHz. Additionally, two carriers at 2.3 MHz and 2.8 MHz still lower than the lower limit frequency of the lower sideband are frequency modulated with a audio signal to thereby record two channels of audio signals which are frequency-division multiplexed and recorded together with the video FM signal. Furthermore, to comply with the demand for higher grade audio signals increasing with the popularization of the compact disk, audio signals are digitized by pulse code modulation (PCM) in the band lower than 1.75 MHz on the still lower side of the audio carrier at 2.3 MHz, and EFM-modulated audio EFM signals (PCM audio signals) are recorded. A spectrum of these video FM signals, audio FM signals and sound EFM signals is shown in FIG. 3.

Figure 4:
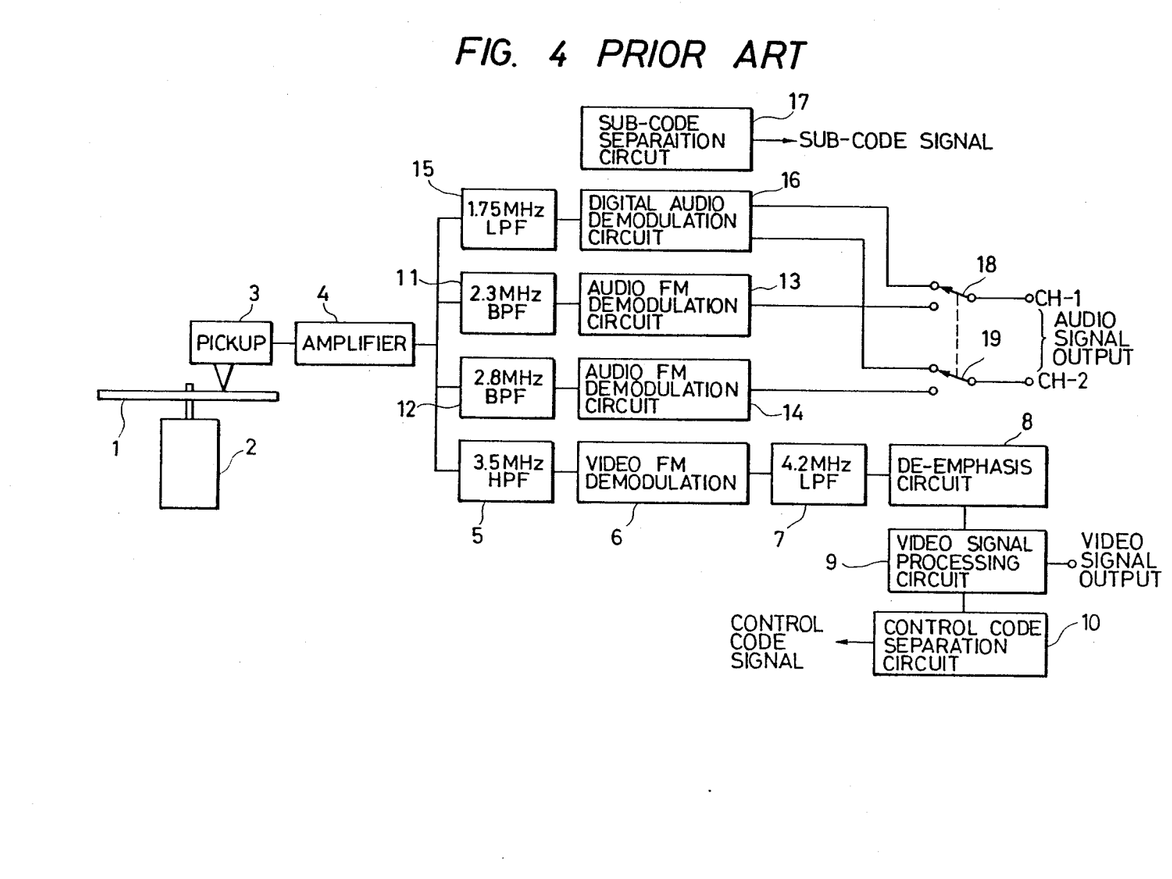
FIG. 4 is a block diagram showing a convention video disk player.

FIG. 4 is a block diagram of a video disk player which reproduces such a video disk. A pickup 3 reproduces a recorded signal from a disk 1 which is rotated by means of a motor 2. The reproduced signal is amplified by an amplifier 4.

The output of the amplifier 4 is input to a high-pass filter 5 having a cut-off frequency at 3.5 MHz, whereby the video FM signal component is separated. The video FM signal is input to a demodulation circuit 6 and is frequency demodulated. The demodulated video signal is input to a low-pass filter 7, whereby unnecessary high frequency components of frequency over 4.2 MHz are eliminated. Furthermore, this signal is de-emphasized by means of a de-emphasis circuit 8 by the quantity corresponding to the known pre-emphasis quantity and is input to a processing circuit 9. The processing circuit 9 outputs a video signal modified with a predetermined processing.

A part of the output of the processing circuit 9 is also input to a separation circuit 10. The separation circuit 10 separates a predetermined control code signal (for instance, a 24-bit code) from the input signal and outputs it. This control code signal is inserted and disposed in, for example, a specific horizontal scanning line in the vertical retrace line period. A variety of controls are performed corresponding to the separated control code signal.

On the other hand, two band-pass filters 11 and 12 having center frequencies set at 2.3 MHz and 2.8 MHz separate respectively the two channels of audio FM signals from the output of the amplifier 4. Separated audio FM signals are input to two demodulation circuits 13 and 14 and are there frequency demodulated.

Besides, a low-pass filter 15 separates components below 1.75 MHz, i.e., the voice EFM signal. The audio EFM signal is input to a demodulation circuit 16, EFM demodulated, and separated into two channels of audio signals. These audio signals are output after further D/A conversion.

Either of the two channels of audio signals which are output from demodulation circuits 13 and 14 and two channels of audio signals which are output from the demodulation circuit 16 is selected by means of interlocking switches 18 and 19 and is output. A user may change over switches 18 and 19 as occasion demands.

A part of the output of the digital audio demodulation circuit 16 is also input to a separation circuit 17. The separation circuit 17 separates a sub-code signal from the input signal and outputs it. A variety of controls are performed corresponding to this sub-code signal.

Recently, the demand for better picture quality is increasing, and so-called high grade television broadcasting has been proposed. It has been also proposed that these high grade television signals are to be recorded on a video disk by the MUSE system. However, even if the luminance signal is compressed, a band of approximately 8.1 MHz is required in the case of the MUSE system. Therefore, it is required to change the existing standard in order to perform recording and reproduction by means of an optical video disk. When the standard is changed, however, the compatibility with a conventional optical video disk can no longer be expected.

In view of the foregoing, it is an object of the present invention to provide video signals of better picture quality while securing the compatibility with a conventional video disk.

SUMMARY OF THE INVENTION

In view of the foregoing, it is an object of the present invention to provide a record reproducing method of a recording medium and a reproduction apparatus thereof which make it possible to improve the resolution and to improve the picture quality of the reproduced image.

The record reproducing method according the the present invention is characterized in that the frequency band occupied by the carrier channel of the digital audio signal and the frequency band occupied by the carrier channel of the video signal are arranged to be adjacent to each other.

Further, the reproducing apparatus according to the present invention includes a separating means having a variable frequency band for separating the video signal component out of the read signal from the recording medium. The apparatus has such a construction that change-over control is performed so as to make the frequency band of this separating means a narrow-band in reproducing the recording medium on which the analog audio signal has been recorded.

Furthermore, the record reproducing method according to the present invention is characterized in that the frequency band occupied by the carrier channel of the digital audio signal and the frequency band occupied by the carrier channel of the video signal are arranged to be adjacent to each other. An identification signal showing that both carrier channels are adjacent to each other is also recorded at the time of recording, to thereby set the reproduction bandwidth of the video signal based on this identification signal at the time of reproduction.

In another aspect of the present invention, a first type of video disk is recorded in frequency-division multiplex with a audio FM signal, a audio EFM signal and a video FM signal. Then, the audio EFM signal and the audio FM signal obtained by frequency modulation of a video signal in a frequency band wider than that of the first video disk are recorded on a second type of disk.

The video disk record reproduction system of the present invention is further characterized in that a first type of video disk is recorded by frequency-division multiplexing with a first video FM signal obtained by frequency modulation of a video signal in a first frequency band, a audio FM signal obtained by frequency modulation of a audio signal, and a audio EFM signal obtained by EFM modulation of the audio signal. On the other hand, a second type of video disk is recorded by frequency-division multiplexing with a second video FM signal obtained by frequency modulation of the video signal in a second frequency band which is wider than the first frequency band so as to correspond to the case of the first type of video disk and with the audio EFM signal obtained by EFM modulation of the audio signal so as to correspond to the case of the first video disk.

The invention is yet further characterized in that there is provided a high-pass filter for separating the video signal from the audio signal at a former stage of a demodulation circuit for frequency demodulating the video signal. When the second type of video disk is reproduced, the cut-off frequency of the high-pass filter is changed over so as to make it lower than the case of reproducing the first type of video disk.

On the second type of video disk is recorded a signal according to the first type of video disk. On the first type of video disk, the audio FM signal obtained by frequency modulation of the audio signal, the audio EFM signal obtained by EFM modulation of the audio signal, and the video FM signal obtained by frequency modulation of the video signal in the first frequency band are recorded. The video signal in the second frequency band which is wider than the first frequency band is frequency modulated so as to correspond to the case of the first video disk, whereby the video FM signal is generated. Further, the audio EFM signal obtained by EFM modulation of the audio signal is generated so as to correspond to the first video disk. These video FM signal and audio EFM signal are recorded on the second type of video disk with frequency-division multiplexing. No audio FM signal is recorded on the second type of video disk.

On the first type of video disk are recorded the audio signal and the video signal. The audio signal and the video signal are also recorded on the second type of video disk, but the video signal is made to have a wider band than on the first type of video disk. The video signal is input to a demodulation circuit and frequency demodulated after being separated from the audio signal by means of a high-pass filter. When the second video disk is reproduced, the cut-off frequency of the high-pass filter is changed over to be lower than the case when the first video disk is reproduced.

DETAILED DESCRIPTION OF THE PREFERRED EMBODIMENTS

Several embodiments of the present invention will be described in detail hereafter with reference to the accompanying drawings.

On a recording medium according to the present invention, a audio signal which is digitized in a pulse train signal by means of a predetermined digital modulation system is recorded by being superposed on an FM modulation signal of a video signal. The video signal is frequency-converted so as to obtain a sync tip at 7.6 MHz, a pedestal level at 8.1 MHz, and a white peak at 9.3 MHz. Besides, the audio signal is digitized by means of a modulation system such as the PCM (Pulse Code Modulation) and is converted into a pulse train signal.

The pulse train signal is made suitable for recording by means of the EFM system for instance. The frequency spectrum of the pulse signal forms frequency components having a width of 3T through 11T. Here T represents the bit period of the PCM signal, wherein the pulse of 3T is at approximately 720 kHz, and the pulse of 11T which is the largest width is at approximately 200 kHz. Such a pulse train signal is superposed on the video primary carrier at a level under approximately 1/10 or less. The pulse train signal is slice-amplified in the vicinity of the zero crossing point and recorded as a signal which is pulse-width modulated.

Figure 5:
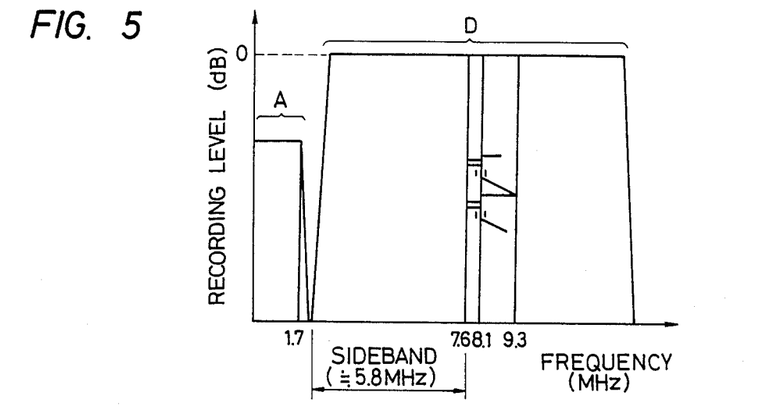
FIG. 5 shows a record spectrum of a recording medium recording by the recording system according to the present invention.

A recording spectrum of the recording medium which is recorded by the above-mentioned recording system is shown in FIG. 5. In FIG. 5, the portion marked A denotes the EFM signal component for digital audio, and the portion marked D denotes the FM signal component for the video signal. As it is clearly seen in the figure, the frequency band occupied by the carrier channel of the digital audio signal and the frequency band occupied by the carrier channel of the video signal are arranged to be adjacent to each other. In other words, as it is apparent from the comparison with FIG. 1 which shows a conventional record spectrum, audio carriers at 2.3 MHz and 2.8 MHz are omitted and the video signal is made to have a wide-band by expanding the sideband of the video carrier.

Figure 6:
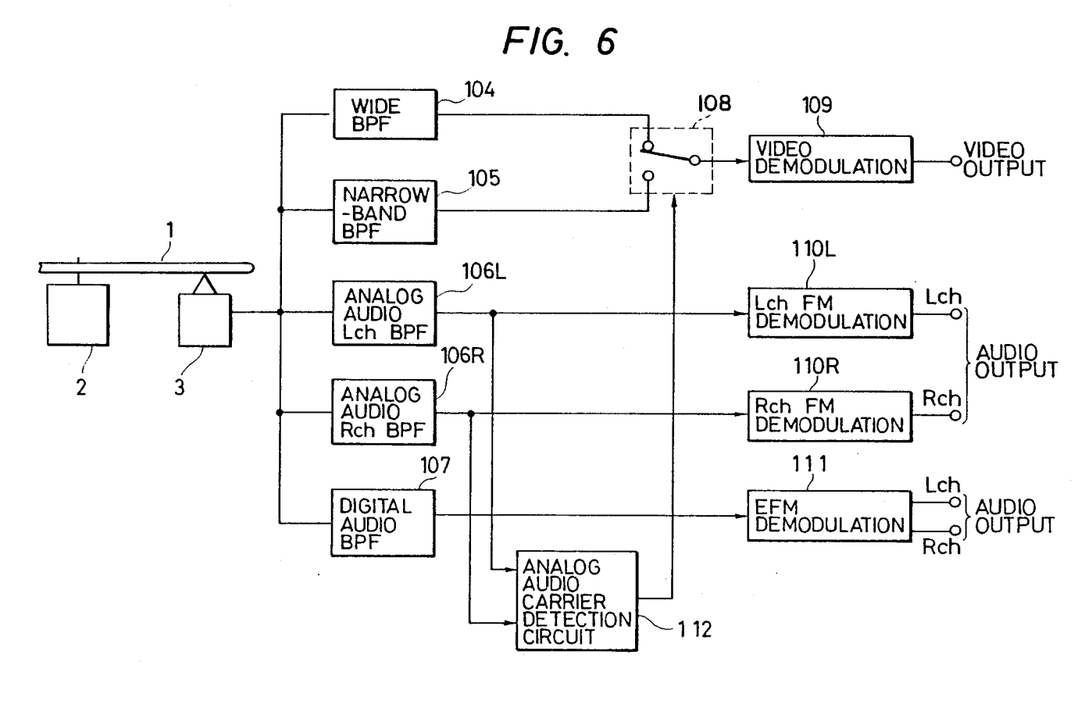
FIG. 6 is a block diagram showing a first embodiment of a reproduction apparatus according to the present invention.

FIG. 6 is a block diagram showing an embodiment which is able to reproduce a video disk recorded by such a recording method as well as a video disk recorded by a conventional system. In the figure, a video disk 1 is rotatably driven by a spindle motor 2. The record information on the video disk 1 is read by a pickup 3. An RF (Radio-Frequency) signal which is the read output of this pickup 3 is supplied in parallel to five filters; a band-pass filter 104 for a wide-band video FM signal, a band-pass filter 105 for a narrow-band video FM signal, a band-pass filter 106L for an analog audio left channel FM signal, a band-pass filter 106R for an analog voice right channel FM signal and a band-pass filter 107 for a digital audio EFM signal.

The pass-band of the band-pass filter 104 for the wide-band video FM signal is set corresponding to the frequency band D occupied by the carrier channel of the video signal shown in FIG. 5 while, on the other hand, the pass-band of the band-pass filer 105 for the narrow-band video FM signal is set corresponding to the frequency band D occupied by the carrier channel of the video signal shown in FIG. 1. The video FM signals passing these band-pass filters 104 and 105, respectively, become two inputs to a selecting switch 108. Either one of these signals is selected by means of this switch 108 and becomes the video output after being demodulated by a video demodulation circuit 109.

The band-pass filters 106L and 106R for analog voice L and R channel FM signals are provided for the purpose of passing audio carrier components B and C at only 2.3 MHz and 2.8 MHz out of the reproduced RF signals in reproducing the video band-pass filter recorded by means of a conventional recording system using the conventional spectrum of FIG. 1. Respective outputs become left and right audio outputs after being demodulated by FM demodulation circuits 110L and 110R. On the other hand, the digital audio EFM signal separated out of the reproduced RF signal by a band-pass filter 107 for the digital audio EFM signal becomes the left and right audio signals after being demodulated by an EFM demodulation circuit 111.

A detection circuit 111 detects that the analog audio carrier is contained in the reproduced RF signal. It judges if the disk being reproduced is a video disk which has been recorded by the conventional recording system by detecting the analog audio carrier. Accordingly, for a conventionally recorded disk, it changes over the selecting switch 108 described above to the side of the band-pass filter 105 for the narrow-band video FM signal.

In the next place, the operation of the present invention will be described.

According to the recording system of the present invention, the frequency band A occupied by the carrier channel of the digital audio signal and the frequency band D occupied by the carrier channel of the video signal are adjacent to each other. Then, the recording is made so that the upper sideband of the band A and the lower sideband of the band D do not cross each other and no analog audio carrier components of 2.3 MHz and 2.8 MHz are contained in the spectrum. Therefore, it is possible to make the lower sideband of the band D to be a wider band of 5.8 MHz compared to the 4.7 MHz of the conventional system. When a video disk thus recorded is reproduced by a reproduction apparatus of the conventional system, reproduction may be performed without any problem except that the analog audio is not reproduced and the video band is limited to 4.7 MHz at the same time.

According to the reproduction apparatus of the present invention shown in FIG. 6, the existence of the analog audio carrier obtained by the band-pass filters 106L and 106R for the analog audio L and R channel FM signals is detected by the detection circuit 112. The selecting switch 108 is automatically changed over to the side of the wide band-pass filter 104 for the wide-band video FM signal when the analog audio carrier does not exist. Correspondingly, it is changed to the side of the narrow band-pass filter 105 for the narrow-band video FM signal when the carrier exists. As the result, a video output not subject to interference by the analog audio carrier is obtainable in the reproduction of the disk recorded by the conventional system. Also, as a result, the wide-band video output is obtainable in the reproduction of the disk recorded by the recording system according to the present invention.

Additionally, the above description is for the case where the band-width of the band-pass filter is changed over by detecting the existence of the analog audio carrier. However, it is also possible by the recording system of the present invention to change over the bandwidth of the band-pass filter by recording an identification signal showing the type of the video disk in the code recorded in, for example, the section between 17H (H:horizontal scanning period) and 18H of the video signal at the time of recording. The reproduction system then detects the existence of this identification signal at the time of reproduction.

Furthermore, the bandwidth of the band-pass filter is described to be changed over by using the selecting switch 108. However, the narrow-band band-pass filter being generally composed of a combination of a wide-band band-pass filter and a audio carrier suppression filter, similar effects as mentioned above are also obtainable by performing ON/OFF control of the audio carrier suppression filter.

Since the video band is made wider by omitting the analog audio carrier according to the record reproducing method of the present invention as described above, the resolution may be improved to a great extent and a very fine picture image is obtainable. Further, a audio beat due to cross modulation by the analog audio carrier and the video carrier in the conventional system will not be generated in a theoretical point of view. Also, the irregular color (jitter) caused by that above-mentioned beat which causes a disturbance of the time base servo will not be generated. Therefore, not only the resolution is improved, but also the picture quality of the reproduced image may be improved.

According to the reproduction apparatus of the present invention, not only the disk recorded by the recording system according to the present invention, but the disk recorded by the conventional recording system can also be generated.

Moreover, when a reproduction apparatus used exclusively for the type of disk recorded by the recording system according to the present invention is constructed, the analog audio carrier suppression filter may be omitted. Accordingly, it is possible to reduce differential gain, differential phase, and frequency ripple, thereby to reduce waveform distortion.

Figure 7:
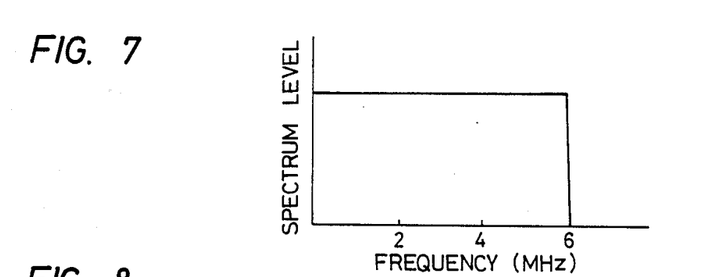
FIG. 7 is a spectrum of the video signal in the baseband thereof.

Turning now to a second preferred embodiment, FIG. 7 shows a spectrum of a video signal (a luminance signal) recorded on an optical video disk according to the present invention. That is, according to the present invention, the frequency band of a video signal in the baseband is set to have wide band of approximately 6 MHz compared to 4.2 MHz in FIG. 2. Conditions other than the frequency band are set in the similar manner as a conventional case with the NTSC system. Since the frequency band is expanded 1.5 times as wide as that in a conventional case, the horizontal resolution is improved 1.5 times, too.

The video signal in this wide band is frequency-modulated with the similar standard corresponding to the case of the conventional narrow-band (4.2 MHz), and is recorded on an optical video disk. Naturally, the bandwidth, etc. of a filter in the modulation system is improved so that a video signal in this wide band may pass therethrough. However, in order to maintain the compatibility with the narrow-band disk, the group delay characteristic and the pre-emphasis characteristic up to 4.2 MHz are set in the similar manner as the case of the narrow-band disk, and a predetermined characteristic different from that of the narrow-band disk is set only for high frequency components higher than 4.2 MHz.

Figure 8:
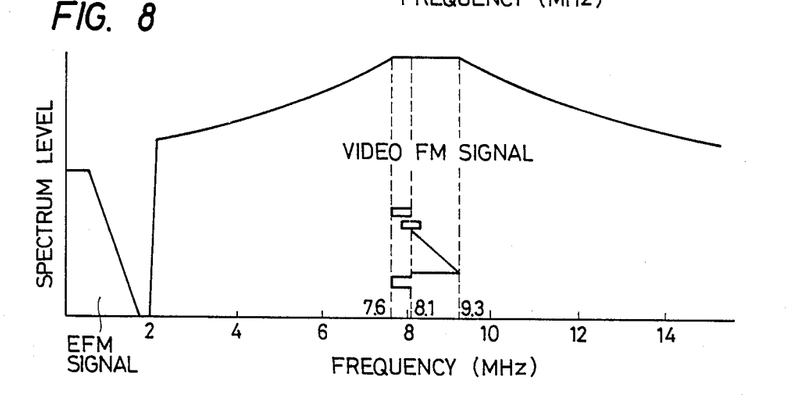
FIG. 8 is a spectrum of a recording signal thereof.

The spectrum of a frequency-modulated video signal is shown in FIG. 8, wherein the lower limit of the first sideband on the lower side thereof appears at approximately 2.1 MHz. The spectrum of FIG. 8 is nearly the same as that of FIG. 5. Accordingly, the audio FM signal cannot be recorded. Thus, only the audio EFM signal is recorded with exactly the same standard corresponding to a conventional case.

In such a way, the second type of disk will be recorded with the audio EFM signal and the video FM signal according to the first type of disk on which the audio EFM signal, the audio FM signal and the video FM signal have been recorded.

Figure 9:
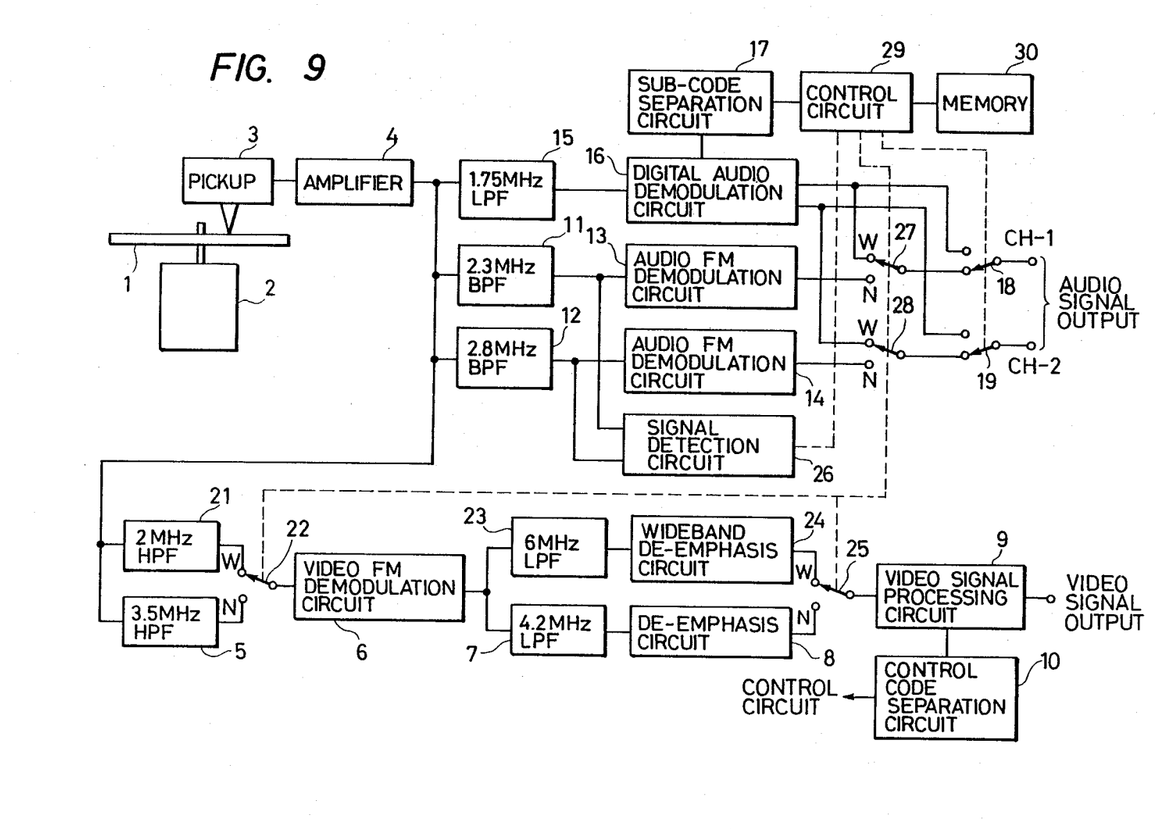
FIG. 9 is a block diagram showing a video disk player according to a second embodiment of the present invention incorporating two novel features.

FIG. 9 is a block diagram showing a video disk player according to the present invention. Like parts corresponding to those shown in FIG. 4 are shown with same marks, and detailed description thereof is omitted.

When a disk which is being reproduced is the first type of disk, band-pass filters 11 and 12 separate and output the carriers of the two audio FM signals. A detection circuit 26 compares the output level of band-pass filters 11 and 12 with a predetermined reference level, and outputs, for example, an H signal in case of the detected level being at the reference level and above, and outputs an L signal in case of its being below the reference level. Since the H signal is input at that time, a control circuit 29 consisting of a microcomputer, etc. has interlocking switches 22, 25, 27 and 28 change over to the side of a respective contact N. As a result, the video signal in the narrow-band and the selected audio signal are reproduced and output from the first disk in the similar manner as described above.

It is needless to say that, when a code identifying the first type of disk and the second type of disk has been recorded in the sub-code of the control code signal of the video signal or of the audio signal, it may be also possible to arrange the system so as to change over switches 22, 25, 27 and 28 corresponding to the outputs of separation circuits 10 or 17.

It is also possible to arrange that the results once so identified are stored in a memory 30 and that switches are thereafter controlled corresponding to that memory. For such an arrangement, identification is required to be performed only once when reproduction is commenced for the first time after the disk is mounted, for instance. However, a different situation may be considered in which both a part of the first type of disk and a part of the second type disk are included in one physical disk. Therefore, it is desirable to always monitor the output of the detection circuit 26 during reproduction operation, to thereby change over respective switches any time corresponding to the output thereof. Further, it is also desirable, when the identification signal is inserted into the control code signal or the sub-code, to arrange so as to insert repeatedly the identification signal into each predetermined unit such as field, frame and block.

When the second type of disk is reproduced, switches 22, 25, 27 and 28 are changed over to the side of the respective contacts W.

At this time, the output of the amplifier 4 is input to a demodulation circuit 6 through a high-pass filter 21 having a cut-off frequency at 2 MHz. It is also possible to prevent the beat interference caused by the leakage of the audio FM signal by providing a trap circuit which blocks the audio FM signals (2.3 MHz and 2.8 MHz) in the reproduction channel (high-pass filter 5) of the first type of disk. However, since no audio FM signal exists in the second type of disk, such a trap circuit is not inserted in the high-pass filter 21. By means of the high-pass filter 21, the video FM signal above the lower limit of the first sideband on the lower side is separated and extracted. The video signal which is frequency demodulated by the demodulation circuit 6 is input to a low-pass filter 23, whereby unnecessary high frequency components higher than 6 MHz are eliminated. The output of the low-pass filter 23 is de-emphasized by a de-emphasis circuit 24 corresponding to known pre-emphasis performed in the recording. The group delay characteristic, the de-emphasis characteristic, and so forth, up to approximately 4.2 MHz of the low-pass filter 23 and the de-emphasis circuit 24 correspond to those of the de-emphasis circuit 8.

The output of the de-emphasis circuit 24 is output to a processing circuit 9 through a switch 25. The operation is the same thereafter as that described above.

As it will be recognized by comparing FIG. 8 with FIG. 3, the upper limit of the first sideband on the upper side of the video FM signal of the second type of disk is higher than that of the first type of disk. Therefore, that portion may not be read out sometimes by the pickup 3. If only the sideband on the lower side can be read out, however, it is possible to reproduce the original video signal.

No audio FM signal is recorded on the second type of disk. Thus, even if a user changes over switches 18 and 19 to either side, the output of the demodulation circuit 16 may be always selected by changing over switches 27 and 28 to the side of the contact W. As a result, such cases will be prevented that the user has changed switches 18 and 19 to the side of demodulation circuits 13 and 14 and no audio signal is output, thereby misjudging as a trouble.

When the second type of disk is reproduced by utilizing a player for the conventional first disk player (shown in FIG. 4), it is possible to reproduce and output the voice signal by means of the EFM signal by changing over switches 18 and 19 to the side of the demodulation circuit 16. Furthermore, components of the video FM signal are removed which are lower than 3.5 MHz by means of the high-pass filter 5. The video signal in the baseband is removed of its components which are higher than 4.2 MHz by means of the low-pass filter 7. Thus, the picture image of higher quality is unobtainable. However, the group delay characteristic and the pre-emphasis characteristic below 4.2 MHz have been set in the same manner as the case of the narrow frequency band as described above. Accordingly, the video signal which is output from the de-emphasis circuit 8 will not be degraded to be worse than the conventional case, thereby providing almost the same degree of the picture quality.

In a video disk record reproduction system of the present invention, a first type of video disk is recorded by frequency-division multiplexing with a first video FM signal obtained by frequency modulation of a video signal in a first frequency band, a audio FM signal obtained by frequency modulation of a audio signal, and a audio EFM signal obtained by EFM modulation of the audio signal. Then, a second video FM signal obtained by frequency modulation of the video signal in a second frequency band which is wider than the first frequency band so as to correspond to the case of the first type of video disk, and the audio EFM signal obtained by EFM modulation of the audio signal so as to correspond to the case of the first type of video disk are recorded on the second type of video disk with frequency-division multiplexing. Accordingly, it is made possible to provide a audio signal and a video signal having a wide band and a high picture quality while maintaining the compatibility with the conventional first type of disk.

Furthermore, according to the present invention, the video disk player is characterized in that there is provided a high-pass filter for separating the video signal from the audio signal at a former stage of a demodulation circuit for frequency-demodulating the video signal, and that, when the second type of video disk is reproduced, the cut-off frequency of the high-pass filter is changed over so as to make it lower than the case of reproducing the first video disk. Accordingly, it is possible to provide a audio signal and a video signal of a wider band and a higher picture quality while maintaining the compatibility with the conventional first disk.

What is claimed is:

1. A recording reproducing method for reproducing from a recording medium, a video signal and a digital audio signal superposed on said recording medium, said method comprising the steps of:
   detecting from a recording medium a recorded signal;
   a first extracting step of extracting from detected said recorded signal, a first carrier channel of a digital audio signal, said first carrier channel occupying a first frequency band; and
   a second extracting step of extracting from detected said recorded signal, a second carrier channel of a video signal, said second carrier channel occupying a second frequency band adjacent to said first frequency band.

2. A method as recited in claim 1, wherein said first frequency band is of lower frequency than said second frequency band.

3. A method as recited in claim 2, wherein said second extracting step of extracting said second carrier channel comprises a bandpass operation for cutting off components of detected said recorded signal above and below said second frequency band.

4. A method as recited in claim 2, further comprising the steps of:
   a third extracting step of extracting from detected said recorded signal, a third carrier channel of said video signal, said third carrier channel occupying a third frequency band narrower than said second frequency band; and
   selecting one of said second and third extracting steps dependent upon a recording characteristic of said recording medium.

5. A method as recited in claim 4, wherein said selecting step comprises setting a lower frequency cut-off for extracting said video signal.

6. A method as recited in claim 5, wherein said recording medium is selectively recorded with an identification signal being indicative of said recording characteristic of said recording medium, and comprising a further step of detecting the existence of said identification signal and in response thereto, in performing said selecting step, selecting said second extracting step.

7. A method as recited in claim 5, wherein said recording medium is selectively recorded with an analog audio carrier, and comprising a further step of detecting the existence of said analog audio carrier and in response thereto, in performing said selecting step, selecting said third extracting step.

8. A video disk player for reproducing video and audio signals from both a first type of video disk on which an audio signal and a video signal are recorded and a second type of video disk on which an audio signal and a video signal having a wider frequency band than said video signal of said first type of disk, said player comprising:
   means for reading a read signal recorded on a video disk;
   means for obtaining an audio signal from said read signal;
   filtering means having a lower frequency cut-off and an upper frequency cut-off for obtaining a video signal from said read signal; and
   means for adjusting said lower frequency cut-off of said filtering means in accordance with whether a read said video disk is of said first type or of said second type.

9. A video disk player as recited in claim 8, wherein said filtering means comprises a high-pass filter receiving said read signal and separating said video signal from said read signal, and further comprising a demodulation circuit receiving an output from said high-pass filter and frequency-demodulating said video signal, and a low-pass filter receiving an output from said demodulation circuit.

10. A video disk player as recited in claim 8, wherein said filtering means comprises two filtering means connected in parallel and having different lower frequency cutoffs from one another, and wherein said means for adjusting comprises a switch selectively supplying said video signal to one of said two filtering means.

11. A video disk player as recited in claim 8, wherein said audio signal is a digital audio signal, and wherein said disk is selectively recorded with an analog audio carrier, and said player further comprising means for detecting the existence of said analog audio carrier on said disk, wherein said means for adjusting is responsive to said means for detecting.

12. A video disk player as recited in claim 8, wherein said disk is selectively recorded with an identification signal indicating that said audio signal and said video signal are recorded in adjacent frequency bands, and said player further comprising means for determining said identification signal from said read signal, and wherein said means for adjusting is responsive to said means for determining.

* * * * *